(12) United States Patent
Kim et al.

(10) Patent No.: US 12,311,765 B2
(45) Date of Patent: May 27, 2025

(54) DUAL INTEGRATED CONTROL APPARATUS FOR AUTONOMOUS VEHICLE AND METHOD OF CONTROLLING OPERATION OF THE SAME

(71) Applicants: Hyundai Motor Company, Seoul (KR); Kia Corporation, Seoul (KR)

(72) Inventors: Eun Sik Kim, Gwangmyeong-si (KR); Jae Wan Cho, Seoul (KR); Won Jin Jeong, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 288 days.

(21) Appl. No.: 18/076,779

(22) Filed: Dec. 7, 2022

(65) Prior Publication Data
US 2024/0059146 A1 Feb. 22, 2024

(30) Foreign Application Priority Data
Aug. 16, 2022 (KR) .................. 10-2022-0102156

(51) Int. Cl.
| | |
|---|---|
| *G06F 7/00* | (2006.01) |
| *B60K 35/00* | (2006.01) |
| *B60W 60/00* | (2020.01) |
| *B60K 35/10* | (2024.01) |

(52) U.S. Cl.
CPC ......... *B60K 35/00* (2013.01); *B60W 60/0053* (2020.02); *B60K 35/10* (2024.01); *B60K 2360/135* (2024.01); *B60K 2360/143* (2024.01); *B60K 2360/682* (2024.01)

(58) Field of Classification Search
CPC .............. B60K 35/00; B60K 2360/143; B60K 2360/682; B60K 2360/135; B60K 35/10; B60W 60/0053
See application file for complete search history.

(56) References Cited

U.S. PATENT DOCUMENTS

| | | | |
|---|---|---|---|
| 6,585,073 B2 | 7/2003 | Lorenz | |
| 2002/0000341 A1* | 1/2002 | Lorenz | ..................... G05G 1/04 180/443 |
| 2009/0223736 A1 | 9/2009 | Ruhter et al. | |

FOREIGN PATENT DOCUMENTS

| | | |
|---|---|---|
| JP | 4726521 B2 | 7/2011 |
| JP | 5406096 B2 | 2/2014 |
| JP | 2018154205 A | 10/2018 |
| JP | 6686930 B2 | 4/2020 |
| KR | 101166895 B1 | 7/2012 |
| WO | WO 2005120929 A1 | 12/2005 |

* cited by examiner

Primary Examiner — Adam M Alharbi
(74) Attorney, Agent, or Firm — Fish & Richardson P.C.

(57) ABSTRACT

The present disclosure relates to a dual integrated control apparatus for an autonomous vehicle and a method of controlling an operation of the same, that allow a user to control operations of two joystick levers based on whether the joystick levers are touched and on a change in driving modes of a vehicle in a configuration in which a dual integrated control apparatus having the joystick levers is provided in the autonomous vehicle.

19 Claims, 8 Drawing Sheets

DUAL INTEGRATED CONTROL APPARATUS FOR AUTONOMOUS VEHICLE AND METHOD OF CONTROLLING OPERATION OF THE SAME

CROSS REFERENCE TO RELATED APPLICATION

The present application claims priority of Korean Patent Application No. 10-2022-0102156 filed on Aug. 16, 2022, the entire contents of which are incorporated herein by reference.

TECHNICAL FIELD

The present disclosure relates to a dual integrated control apparatus for an autonomous vehicle and a method of controlling an operation of the same, and more particularly, to a technology related to an apparatus and method for controlling operations of two joystick levers based on whether the joystick levers are touched and on a change in driving modes of a vehicle in a configuration in which a dual integrated control apparatus having the joystick levers is provided in the autonomous vehicle.

BACKGROUND

An autonomous vehicle refers to a smart vehicle to which an autonomous driving technology is applied so that the vehicle autonomously arrives at a destination even though a driver does not directly manipulate a steering wheel, an accelerator pedal, and a brake pedal.

In a case in which an autonomous driving situation is universally implemented, the driver may select a manual driving mode in which the driver directly drives the vehicle and an autonomous driving mode in which the driver does not directly drive the vehicle and the vehicle autonomously travels to the destination.

Meanwhile, when an emergency situation occurs during autonomous driving, any one of the passengers in the vehicle needs to manually and directly drive the vehicle. To this end, the vehicle needs to have a device configured to be operated by a user to perform the manual driving mode.

For example, a vehicle manager sometimes controls the vehicle in the manual driving mode by using an apparatus such as a joystick used for a game machine or the like.

The apparatus, which is controlled by the user to drive the vehicle in a situation of the manual driving mode, has a plurality of switches operated to accelerate, brake, and steer the vehicle and perform a gear shift operation. The apparatus is referred to as an integrated control apparatus because the apparatus has the plurality of switches having different functions as described above.

The foregoing explained as the background is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to provide a dual integrated control apparatus for an autonomous vehicle and a method of controlling an operation of the same, which allow a user to control operations of two joystick levers based on whether the joystick levers are touched and on a change in driving modes of the vehicle in a configuration in which a dual integrated control apparatus having the joystick levers is provided in the autonomous vehicle, thereby improving driving safety while restricting the occurrence of an accident.

According to one aspect, there is provided a dual integrated control apparatus for an autonomous vehicle, which is provided as a dual integrated control apparatus in an autonomous vehicle, the dual integrated control apparatus including: a joystick lever provided for each of the integrated control apparatuses; and a touch sensor provided for each of the joystick levers, in which when a signal related to a user's touch is generated from the joystick lever, only one joystick lever is brought into a function activation state, and the remaining one joystick lever is brought into a function deactivation fixed state or a function deactivation movable state, in which the function activation state is a state in which the joystick lever is capable of being operated and one or more of an acceleration signal, a deceleration signal, and a steering signal for the vehicle are generated when the joystick lever is operated, in which the function deactivation fixed state is a state in which the joystick lever cannot be operated, and in which the function deactivation movable state is a state in which the joystick lever is capable of being operated, but the acceleration signal, the deceleration signal, or the steering signal for the vehicle is not generated even though the joystick lever is operated.

The joystick lever may be folded or popped up by an operation of an actuator under the control of a PCB provided in the integrated control apparatus.

Both the two joystick levers may be maintained in a folded state in a state in which the vehicle is turned off, and the state of both the two joystick levers may be changed to a popped-up state as the vehicle enters a manual driving mode when the vehicle is turned on.

When touch signals are generated from both the two joystick levers at a time interval in a state in which the vehicle is turned on, only one joystick lever, from which the touch signal is generated first, may be brought into the function activation state, and the remaining one joystick lever, from which the touch signal is generated later, may be brought into the function deactivation fixed state.

When no touch signal is generated from either of the two joystick levers in a state in which the vehicle is turned on, the state of both the two joystick levers may be changed to a folded state after a predetermined time has elapsed.

Both the two joystick levers may be maintained in a popped-up state when the vehicle is in a manual driving mode, and the state of both the two joystick levers may be changed to a folded state when the vehicle is in an autonomous driving mode.

When a signal for changing a mode from the manual driving mode to the autonomous driving mode is generated, the state of both the two joystick levers may be changed to the function deactivation movable state in the popped-up state after a predetermined time has elapsed.

When the user does not touch either of the two popped-up joystick levers, the state of both the two joystick levers in the non-touched state may be changed to the function deactivation movable state.

When a touch signal is generated from only one joystick lever, the one joystick lever, from which the touch signal is generated, may be brought into the function activation state, and the remaining one joystick lever, from which no touch signal is generated, may be brought into the function deactivation movable state.

When touch signals are generated simultaneously from the two joystick levers without a time interval, only one joystick lever may be brought into the function activation state, and the remaining one joystick lever may be brought into the function deactivation fixed state.

According to another aspect, there is provided a method of controlling an operation of a dual joystick lever in a configuration in which a dual integrated control apparatus is provided in an autonomous vehicle, a joystick lever is provided for each of the integrated control apparatuses, and a touch sensor is provided for each of the joystick levers, the method comprising: a first step of bringing only one joystick lever into a function activation state and bringing the remaining one joystick lever into a function deactivation fixed state in a situation in which a vehicle travels in a manual driving mode, both the two joystick levers are in a popped-up state, and touch signals are generated from both the two joystick levers as a user touches the two joystick levers; and a second step of bringing one joystick lever, from which a touch release signal has been generated, into a function deactivation movable state and maintaining the remaining one joystick lever, from which the touch signal is continuously generated, in the function activation state when the touch release signal is generated from one of the two popped-up joystick levers, in which the function activation state is a state in which the joystick lever is capable of being operated and one or more of an acceleration signal, a deceleration signal, and a steering signal for the vehicle are generated when the joystick lever is operated, in which the function deactivation fixed state is a state in which the joystick lever cannot be operated, and in which the function deactivation movable state is a state in which the joystick lever is capable of being operated, but the acceleration signal, the deceleration signal, or the steering signal for the vehicle is not generated even though the joystick lever is operated.

When the touch signal is generated again as the user touches again the one joystick lever, from which no touch signal is generated, after the second step, the one joystick lever, from which the touch signal is generated again, may be brought into the function deactivation fixed state, and the remaining one joystick lever, from which the touch signal is continuously generated, may be continuously maintained in the function activation state.

When the touch release signals are generated from both the two popped-up joystick levers after the first step, the mode of the vehicle may automatically switch to an autonomous driving mode, and both the two joystick levers may be brought into the function deactivation movable state.

The state of both the two joystick levers may be changed to the folded state when no touch signal is not generated continuously for a predetermined time after both the two joystick levers are brought into the function deactivation movable state.

According to still another aspect, there is provided a method of controlling an operation of a dual joystick lever in a configuration in which a dual integrated control apparatus is provided in an autonomous vehicle, a joystick lever is provided for each of the integrated control apparatuses, and a touch sensor is provided for each of the joystick levers, the method comprising: a first step of maintaining both the two joystick levers in a folded state when a vehicle travels in an autonomous driving mode; a second step of maintaining the vehicle in an autonomous driving mode state and changing the state of both the two joystick levers to a popped-up state when a signal for changing a mode to a manual driving mode is generated in the first step; and a third step of bringing only one joystick lever into a function activation state and bringing the remaining one joystick lever into a function deactivation fixed state or a function deactivation movable state when a signal related to a user's touch is generated from the popped-up joystick lever, in which the function activation state is a state in which the joystick lever is capable of being operated and one or more of an acceleration signal, a deceleration signal, and a steering signal for the vehicle are generated when the joystick lever is operated, in which the function deactivation fixed state is a state in which the joystick lever cannot be operated, and in which the function deactivation movable state is a state in which the joystick lever is capable of being operated, but the acceleration signal, the deceleration signal, or the steering signal for the vehicle is not generated even though the joystick lever is operated.

The joystick lever may be folded or popped up by an operation of an actuator under the control of a PCB provided in the integrated control apparatus.

The two joystick levers, which are popped up in the second step, may be brought into a non-touched state in which the two joystick levers are not touched by the user, and both the two joystick levers in the non-touched state may be brought into the function deactivation movable state.

When the touch signal is generated from only one joystick lever in the third step, the one joystick lever, from which the touch signal has been generated, may be brought into the function activation state, the remaining one joystick lever, from which no touch signal has been generated, may be maintained in the function deactivation movable state, the mode of the vehicle may change from the autonomous driving mode to the manual driving mode, and the user may manipulate the one joystick lever in the function activation state to generate a signal to drive the vehicle in the manual driving mode.

When the touch signals are generated from both the two joystick levers at a time interval in the third step, only one joystick lever, from which the touch signal has been generated first, may be brought into the function activation state, the remaining one joystick lever, from which the touch signal has been generated later, may be brought into the function deactivation fixed state, the mode of the vehicle may change from the autonomous driving mode to the manual driving mode, and the user may manipulate the one joystick lever in the function activation state to generate a signal to drive the vehicle in the manual driving mode.

When no touch signal is generated from either of the two joystick levers after the second step, the state of the two joystick levers may be changed to the folded state, and the vehicle may be continuously maintained in the autonomous driving mode after a predetermined time has elapsed.

Implementations according to the present disclosure provide a method of allowing the user to control the operations of the two joystick levers based on whether the joystick levers are touched and on the change in driving modes of the vehicle in the configuration in which the dual integrated control apparatus having the joystick levers are provided in the autonomous vehicle, thereby improving the safety related to the operations of the joystick levers, restricting the occurrence of an accident, and improving driving safety.

BRIEF DESCRIPTION OF THE DRAWINGS

FIG. 5 is an example flowchart illustrating a control method in a state immediately after the vehicle is turned on.

DETAILED DESCRIPTION

Hereinafter, implementations disclosed in the present specification will be described in detail with reference to the accompanying drawings. The same or similar constituent elements are assigned with the same reference numerals regardless of reference numerals, and the repetitive description thereof will be omitted.

In addition, it should be understood that the accompanying drawings are provided only to allow those skilled in the art to easily understand the exemplary implementations disclosed in the present specification, and the technical spirit disclosed in the present specification is not limited by the accompanying drawings, and includes all alterations, equivalents, and alternatives that are included in the spirit and the technical scope of the present disclosure.

The control unit (controller) may include a communication device configured to communicate with another control unit or a sensor to control a corresponding function, a memory configured to store an operating system, a logic command, and input/output information, and one or more processors configured to perform determination, computation, decision, or the like to control the corresponding function.

Hereinafter, a dual integrated control apparatus for an autonomous vehicle and a method of controlling an operation of the same according to an exemplary implementation of the present disclosure will be described with reference to the accompanying drawings.

The autonomous vehicle includes an integrated control apparatus configured to be directly controlled by a user (manager) to drive a vehicle in a manual driving mode.

The integrated control apparatus may include a one-hand operator that the user may hold with one hand to manipulate a switch or the like, and a two-hand operator that the user may hold and manipulate with two hands.

In some cases, the term "pop-up" may also be referred to as "unfolding," and the term "folding" may also be referred to as "pop-down."

As illustrated in FIGS. 1 to 4, an integrated control apparatus 1 according to the present disclosure includes a body unit 10 configured to define an external body including a housing, and a joystick lever 20 rotatably coupled to the body unit 10 and configured such that a driver holds and manipulates the joystick lever 20 with the user's hand.

Figure 1:
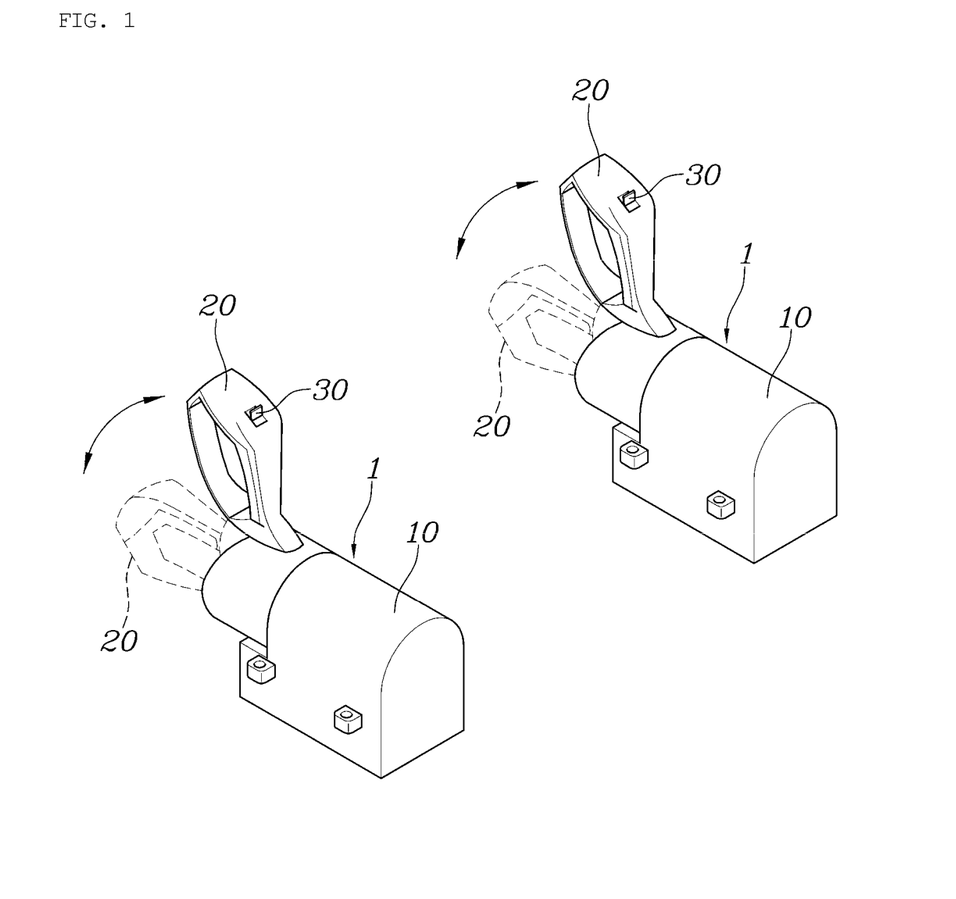
FIG. 1 is a view illustrating an example dual integrated control apparatus having joystick levers according to the present disclosure as provided in an autonomous vehicle.

The integrated control apparatus 1 including the body unit 10 and the joystick lever 20 is provided as a dual integrated control apparatus 1 in an autonomous vehicle. The illustrated right integrated control apparatus may be provided at a right side based on the user in the vehicle so that the user may easily manipulate the right integrated control apparatus with the user's right hand. The illustrated left integrated control apparatus may be provided at a left side based on the user in the vehicle so that the user may easily manipulate the left integrated control apparatus with the user's left hand.

When the integrated control apparatus 1 is provided in the autonomous vehicle, the body unit 10 may be fixed to a predetermined position in a vehicle interior so that the body unit 10 cannot move. As necessary, the user may move the body unit 10 to a desired position and use the body unit 10.

Figure 2:
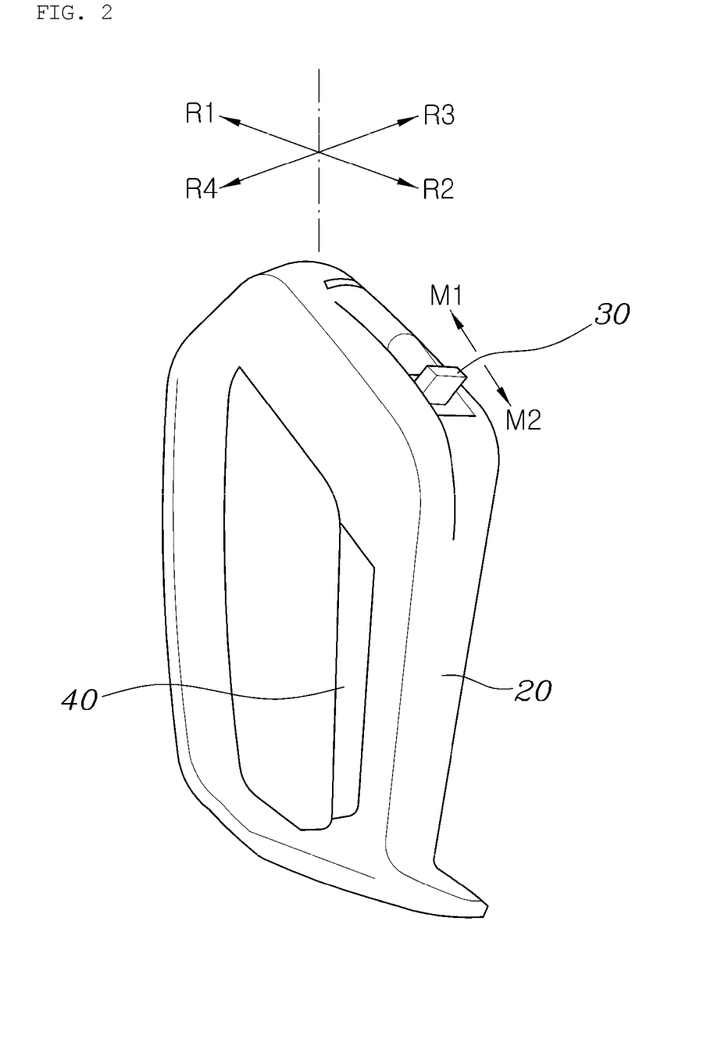
FIG. 2 is a view illustrating the example joystick lever according to the present disclosure.
Figure 3:
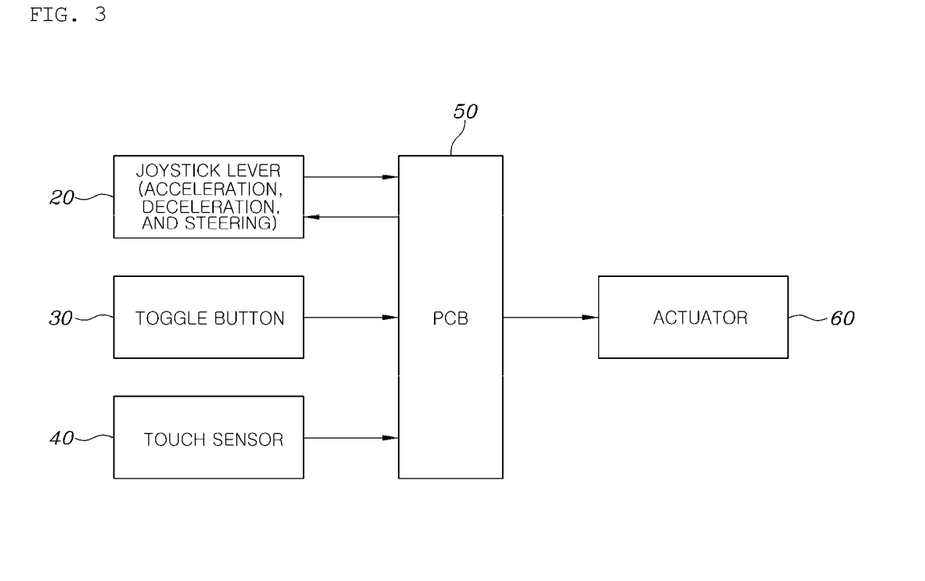
FIG. 3 is a block diagram schematically illustrating an example configuration of the integrated control apparatus according to the present disclosure.

The integrated control apparatus 1 may include the joystick lever 20, a toggle button 30 and a touch sensor 40 provided on the joystick lever 20, and a printed circuit board (PCB) 50 and an actuator 60 provided on the body unit 10.

The user may hold the joystick lever 20 with the user's hand and then manipulate and rotate the entire joystick lever 20 in a forward/rearward direction and a leftward/rightward direction relative to the body unit 10.

When the user rotates the joystick lever 20 forward (in direction R1 in FIG. 2) in the state in which the user holds the joystick lever 20 with the user's hand, the PCB 50 generates a signal related to the acceleration of the vehicle. When the user rotates the joystick lever 20 rearward (direction R2 in FIG. 2), the PCB 50 generates a signal related to the deceleration of the vehicle.

In addition, when the user rotates the joystick lever 20 rightward or leftward (direction R3 or R4 in FIG. 2) in the state in which the user holds the joystick lever 20 with the user's hand, the PCB 50 generates a signal related to the steering of the vehicle.

A change in speed of the vehicle is made in a large range when the vehicle is accelerated or decelerated by the operation of the joystick lever 20, such that the vehicle may be rapidly accelerated or rapidly braked. For example, by the change in speed in the large range, the speed of the vehicle may be changed by 5 km/h or 10 km/h.

The toggle button 30 is provided on the joystick lever 20, and the user may manipulate the toggle button 30 with the user's finger.

The toggle button 30 is provided on an upper surface of the joystick lever 20, and the user may manipulate the toggle button 30 with a thumb of the user's hand that holds the joystick lever 20.

When the user pushes the toggle button 30 forward (direction M1 in FIG. 2), the PCB 50 generates a signal related to the acceleration of the vehicle. When the user pulls the toggle button 30 rearward (direction M2 in FIG. 2), the PCB 50 generates a signal related to the deceleration of the vehicle.

The speed of the vehicle is changed within a smaller range when the vehicle is accelerated or decelerated by the operation of the toggle button 30 than when the speed of the vehicle is changed by the operation of the joystick lever 20. Therefore, the change in speed of the vehicle by the operation of the toggle button 30 may be usefully used when the vehicle needs to travel while the speed thereof is slowly increased or decreased such as a situation in which the vehicle moves for parking, the vehicle is stationary, or the vehicle performs a U-turn. The speed may be changed within a small range, for example, by 1 km/h.

The touch sensor 40 is provided on the joystick lever 20 and may detect that the user holds the joystick lever 20 with the user's hand, i.e., the user touches the joystick lever 20.

For example, the touch sensor 40 may be a capacitive touch sensor and may include a touch button configured to generate a physical signal when the user manipulates the touch button.

In addition, the touch sensor 40 may generate vibration when the user touches the touch sensor 40 so that the user may recognize this situation in a tactile manner.

The actuator 60 may operate to perform a function of folding the joystick lever 20 (a pop-up and folding operation of the joystick lever 20) and a function of locking or unlocking the joystick lever 20. In particular, the actuator 60 serves to generate an operation reaction force when the joystick lever 20 is manipulated to accelerate or decelerate the vehicle.

The actuator 60 may operate under the control of the PCB 50 when a driving mode change signal is generated. The joystick lever 20 may be popped up and folded by the operation of the actuator 60.

The driving modes include an autonomous driving mode and a manual driving mode, and the driving mode change signal may be generated as a signal for a mode change button or switch.

In FIG. 1, a state in which the joystick lever 20 is indicated by the solid line may be the popped-up state, and the user may use the joystick lever 20 in the popped-up state. A state in which the joystick lever 20 is indicated by the dotted line may be a folded state, and the user cannot use the joystick lever 20 in the folded state.

When the joystick lever 20 is locked by an actuator 60, the joystick lever 20 is fixed, such that the joystick lever 20 in the popped-up state cannot rotate forward, rearward, leftward, and rightward. When the joystick lever 20 is unlocked, the joystick lever 20 in the popped-up state may rotate forward, rearward, leftward, and rightward.

Figure 4:
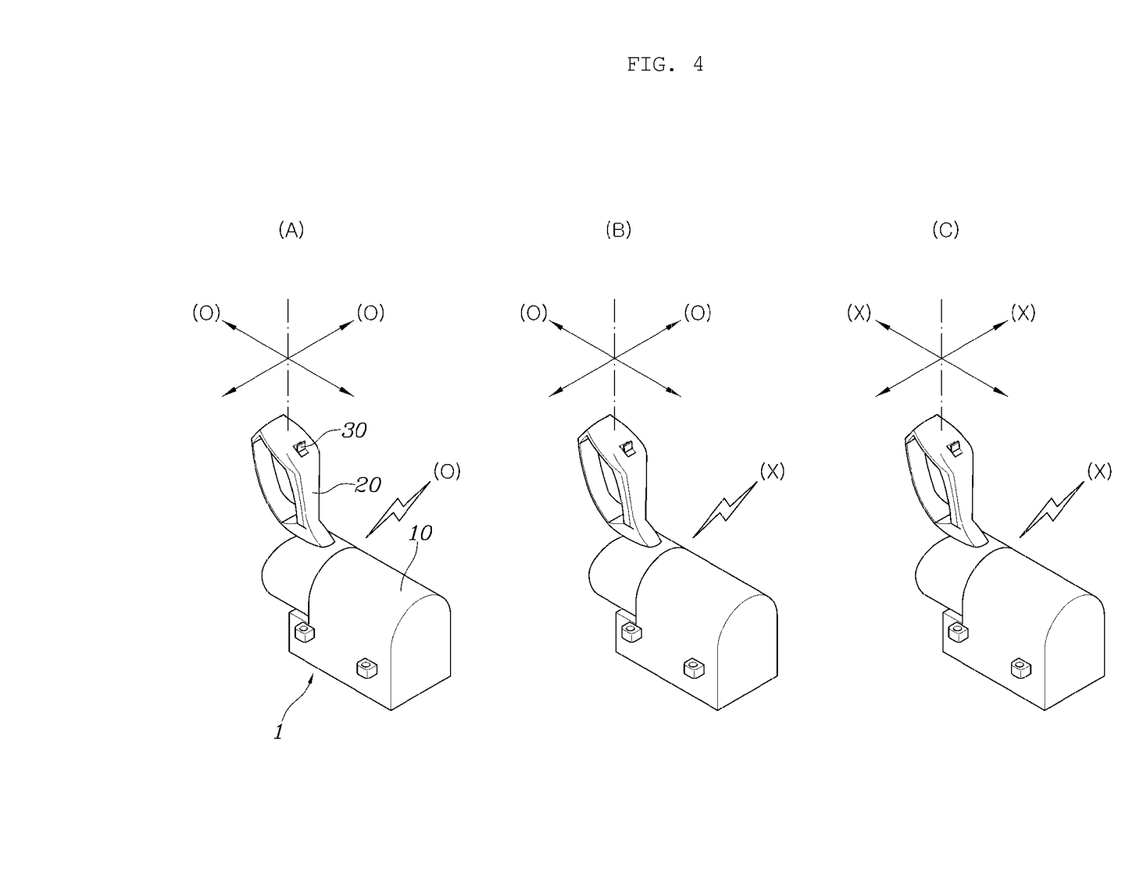
FIG. 4 is a view illustrating a function activation state, a function deactivation movable state, and a function deactivation fixed state of a joystick lever according to the present disclosure.

The integrated control apparatus 1 according to the present disclosure may be in any one of a function activation state, a function deactivation movable state, and a function deactivation fixed state may be implemented based on whether the touch sensor 40 is touched and on a change in driving modes in the state in which the joystick lever 20 is popped up.

FIG. 4A illustrates a situation of the function activation state. When a touch signal is generated as the user touches the touch sensor 40 of the popped-up joystick lever 20, the integrated control apparatus 1 is in the function activation state under the control of the PCB 500.

The function activation state may be defined as a state (O) in which the joystick lever 20 may be rotated in the forward/rearward direction and the leftward/rightward direction by the operation of the actuator 60, and a state (O) in which one or more of an acceleration signal, a deceleration signal, and a steering signal for the vehicle is generated under the control of the PCB 50 when the joystick lever 20 operates.

FIG. 4B illustrates the function deactivation movable state. The function deactivation movable state may be defined as a state (O) in which the joystick lever 20 may be rotated in the forward/rearward direction and the leftward/rightward direction by the operation of the actuator 60, and a state (X) in which the acceleration signal, the deceleration signal, or the steering signal for the vehicle is not generated even though the user manipulates the joystick lever 20.

FIG. 4C illustrates the function deactivation fixed state. The function deactivation fixed state may be defined as a state (X) in which the joystick lever 20 cannot be operated by the operation of the actuator 60, and a state (X) in which the acceleration signal, the deceleration signal, or the steering signal for the vehicle is not generated because the joystick lever 20 cannot be operated.

Hereinafter, the method of controlling the operation of the dual integrated control apparatus for an autonomous vehicle according to the present disclosure will be described.

Figure 5:
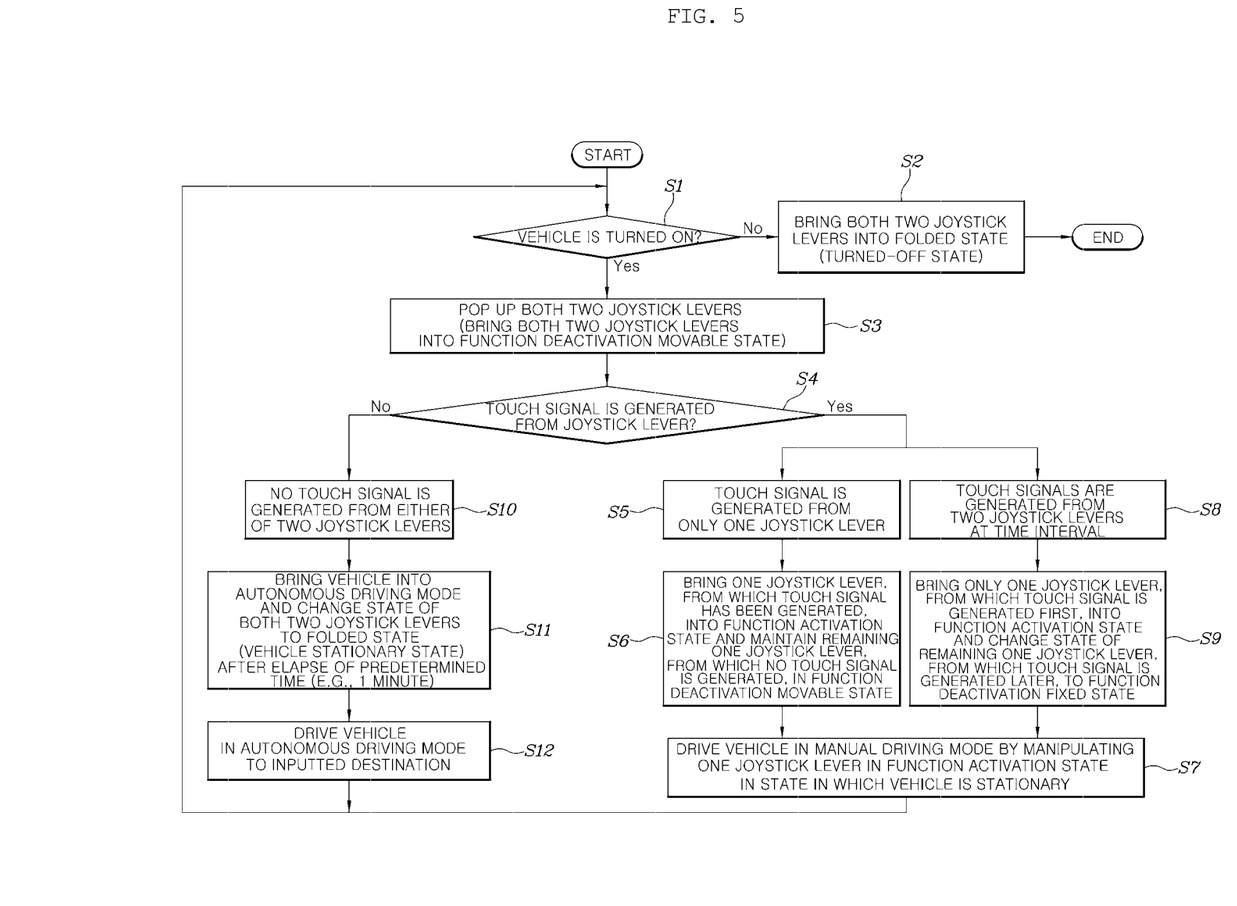

FIG. 5 illustrates a flowchart for explaining a control method in a state immediately after the vehicle is turned on.

The control method according to the present disclosure includes: a first step of maintaining both the two joystick levers 20 in a folded state in a state in which the vehicle is turned off; a second step of changing the state of both the two joystick levers 20 to a popped-up state as the vehicle enters the manual driving mode when the vehicle is turned on; and a third step of bringing only one joystick lever into the function activation state and bringing the remaining one joystick lever into the function deactivation fixed state or the function deactivation movable state when a signal related to the user's touch is generated from the popped-up joystick lever 20.

That is, when the vehicle is in a turned-off (OFF) state in a step (step S1) of determining whether the vehicle is turned on (ON), both the two joystick levers 20 are brought into the folded state (step S2), and a control logic is ended.

When the vehicle is turned on, the vehicle enters the manual driving mode in a state in which the vehicle is stationary, and the state of both the two joystick levers 20 is changed to the popped-up state (step S3).

The two joystick levers 20 popped up in step S3 are in a non-touched state in which the two joystick levers 20 are not touched by the user. In the non-touched state, both the two joystick levers 20 are brought into the function deactivation movable state.

After step S3, a step of determining whether the touch signal is generated from the popped-up joystick lever 20 is performed (step S4).

When the determination result from step S4 indicates that the touch signal has been generated from only one joystick lever (step S5), the one joystick lever, from which the touch signal has been generated, is brought into the function activation state, the remaining one joystick lever, from which no touch signal has been generated, is brought into the function deactivation movable state (step S6), the mode of the vehicle is changed to the manual driving mode in the state in which the vehicle is stationary, and the user manipulates the one joystick lever in the function activation state to generate the signals (the acceleration signal, the deceleration signal, and the steering signal) to drive the vehicle in the manual driving mode, such that the vehicle travels in the manual driving mode (step S7).

As another example, when the determination result from step S4 indicates that the touch signals have been generated from both the two joystick levers 20 at a time interval (step S8), only one joystick lever, from which the touch signal has been generated first, is brought into the function activation state, the remaining one joystick lever, from which the touch signal has been generated later, is brought into the function deactivation fixed state (step S9), the mode of the vehicle is changed to the manual driving mode in the state in which the vehicle is stationary, and the user manipulates the one joystick lever in the function activation state to generate the signals to drive the vehicle in the manual driving mode, such that the vehicle travels in the manual driving mode (step S7).

If the touch signals are generated simultaneously from the two joystick levers 20 without a time interval, only one joystick lever is brought into the function activation state, and the remaining one joystick lever is brought into the function deactivation fixed state. In this case, the one joystick lever brought into the function activation state is any one of the right and left joystick levers that the user may easily and conveniently manipulate.

In addition, as another example, when the determination result from step S4 indicates that no touch signal has been generated from either of the two joystick levers 20 (step S10), the vehicle enters the autonomous driving mode while being maintained in the stationary state after a predetermined time (e.g., 1 minute) has elapsed, both the two joystick levers are brought into the folded state (step S11), and the vehicle travels in the autonomous driving mode to an inputted destination (step S12).

Figure 6:
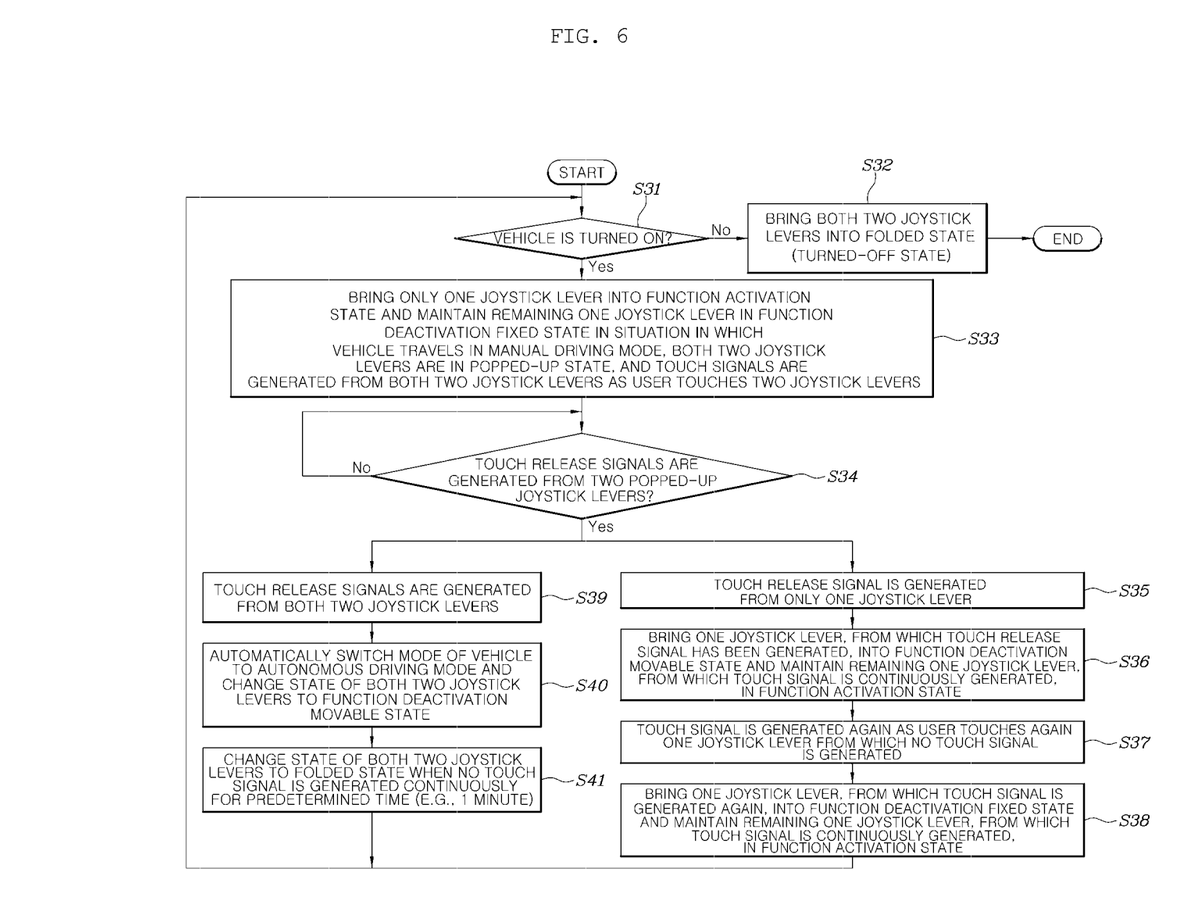
FIG. 6 is an example flowchart illustrating a control method in a driving condition in a manual driving mode.

FIG. 6 is a flowchart for explaining a control method under a driving condition of the manual driving mode.

The control method according to the present disclosure includes: a first step of bringing only one joystick lever 20 into the function activation state and bringing the remaining one joystick lever into the function deactivation fixed state in a situation in which the vehicle is traveling in the manual driving mode, both the two joystick levers 20 are in the popped-up state, and the touch signals are generated from the two joystick levers 20 as the user touches the two joystick levers 20; and a second step of maintaining one joystick lever, from which a touch release signal has been generated, in the function deactivation movable state and maintaining the remaining one joystick lever, from which the touch signal is continuously generated, in the function activation state when the touch release signal is generated from one of the two popped-up joystick levers 20.

That is, when the vehicle is in the turned-off (OFF) state in a step (step S31) of determining whether the vehicle is turned on (ON), both the two joystick levers 20 are brought into the folded state (step S32), and the control logic is ended.

When the vehicle is turned on and travels in the manual driving mode, both the two joystick levers 20 are maintained in the popped-up state.

In the situation of the manual driving mode, the user may touch both the two popped-up joystick levers 20. In this case, the touch signals are generated from both the two joystick levers 20, only one of the two joystick levers 20 is brought into the function activation state, and the remaining one joystick lever is brought into the function deactivation fixed state (step S33).

After step S33, a step of determining whether the touch release signal is generated from the two popped-up joystick levers 20 is performed (step S34).

When the determination result from step S34 indicates that the touch release signal has been generated from only one of the two popped-up joystick levers 20 (the right joystick lever or the left joystick lever) (step S35), the one joystick lever, from which the touch release signal has been generated, is brought into the function deactivation movable state, and the remaining one joystick lever, from which the touch signal is continuously generated, is maintained in the function activation state (step S36).

After step S36, when the touch signal is generated again as the user touches again the one joystick lever (corresponding to the one joystick lever from which the touch release signal is generated in step S36) from which no touch signal has been generated (step S37), the one joystick lever, from which the touch signal has been generated again, is brought into the function deactivation fixed state, and the remaining one joystick lever, from which the touch signal is continuously generated, is maintained in the function activation state (step S38).

As another example, when the determination result from step S34 indicates that the touch release signals have been generated from both the two popped-up joystick levers 20 (step S39), the mode of the vehicle automatically switches to the autonomous driving mode, and the state of both the two joystick levers 20 is changed to the function deactivation movable state (step S40).

Further, after step S40, when no touch signal is generated because the user does not touch the two joystick levers 20 for a predetermined time (e.g., 1 minute), the state of both the two joystick levers 20 is changed to the folded state, and the vehicle travels in the autonomous driving mode to the inputted destination.

Figure 7:
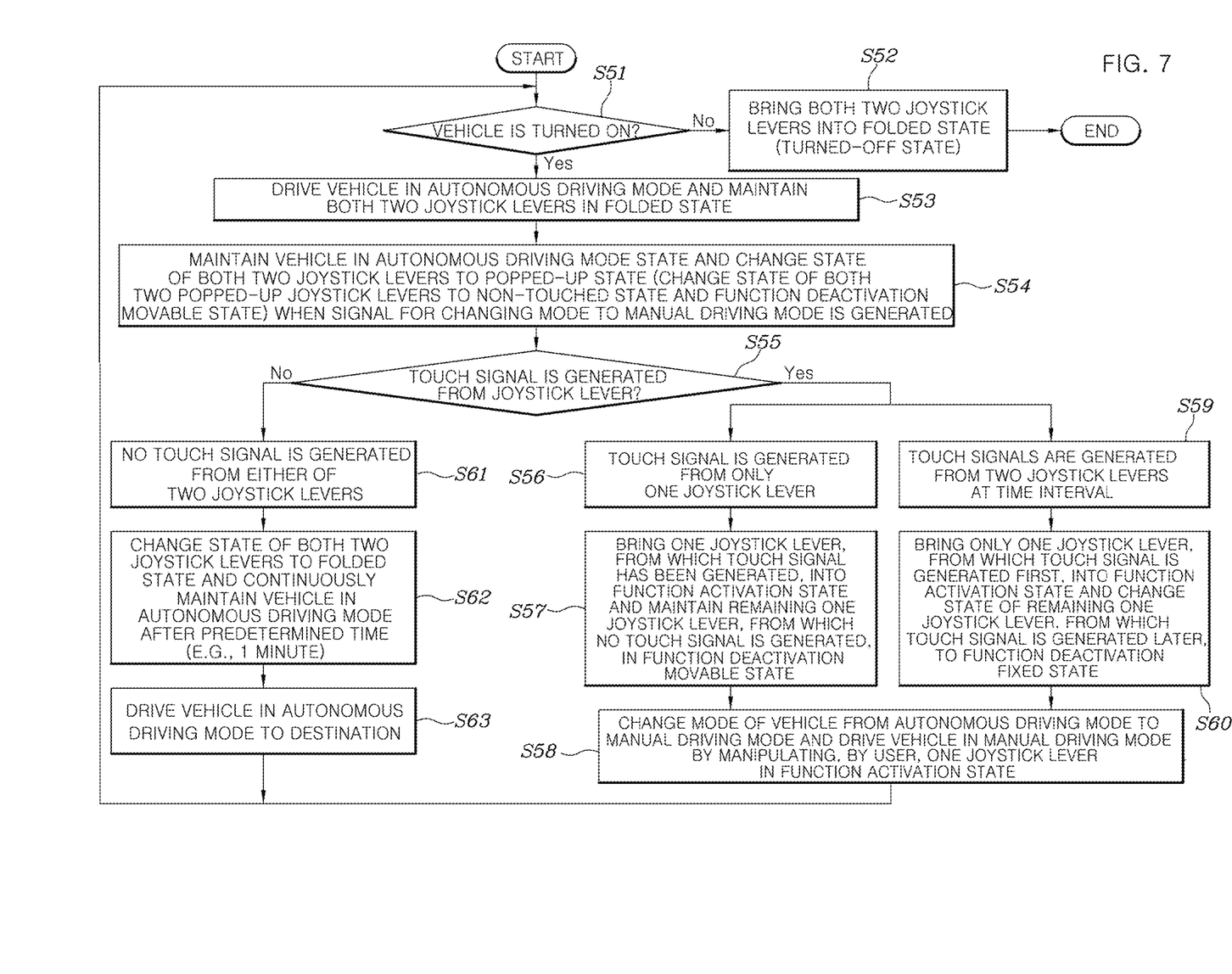
FIG. 7 is an example flowchart illustrating a control method when the mode changes from an autonomous driving mode to the manual driving mode.

FIG. 7 is a flowchart for explaining a control method when the mode changes from the autonomous driving mode to the manual driving mode.

The control method according to the present disclosure includes: a first step of maintaining the two joystick levers 20 in the folded state when the vehicle travels in the autonomous driving mode; a second step of maintaining the vehicle in the autonomous driving mode state and changing the state of both the two joystick levers 20 to the popped-up state when a signal for changing the mode to the manual driving mode is generated in the first step; and a third step of bringing only one joystick lever into the function activation state and bringing the remaining one joystick lever into the function deactivation fixed state or the function deactivation movable state when the signal related to the user's touch is generated from the popped-up joystick lever 20.

That is, when the vehicle is in the turned-off (OFF) state in a step (step S51) of determining whether the vehicle is turned on (ON), both the two joystick levers 20 are brought into the folded state (step S52), and the control logic is ended.

When the vehicle is turned on and travels in the autonomous driving mode, both the two joystick levers 20 are maintained in the folded state (step S53).

After step S53, when the signal for changing the mode to the manual driving mode is generated as the user manipulates the mode change button or switch, the vehicle is continuously maintained in the autonomous driving mode state. In this case, the state of both the two joystick levers 20 is changed from the folded state to the popped-up state (step S54).

The two joystick levers 20 popped up in step S54 are in the non-touched state in which the two joystick levers 20 are not touched by the user. In the non-touched state, both the two joystick levers 20 are brought into the function deactivation movable state.

After step S54, a step of determining whether the touch signal is generated from the popped-up joystick lever 20 is performed (step S55).

When the determination result from step S55 indicates that the touch signal has been generated from only one joystick lever (step S56), the one joystick lever, from which the touch signal has been generated, is brought into the function activation state, the remaining one joystick lever, from which no touch signal has been generated, is maintained in the function deactivation movable state (step S57), the mode of the vehicle is changed from the autonomous driving mode to the manual driving mode, and the user manipulates the one joystick lever in the function activation state to generate the signals (the acceleration signal, the deceleration signal, and the steering signal) to drive the vehicle in the manual driving mode, such that the vehicle travels in the manual driving mode (step S58).

As another example, when the determination result from step S55 indicates that the touch signals have been generated from both the two joystick levers 20 at a time interval (step S59), only one joystick lever, from which the touch signal has been generated first, is brought into the function activation state, the remaining one joystick lever, from which the touch signal has been generated later, is brought into the function deactivation fixed state (step S60), the mode of the vehicle is changed from the autonomous driving mode to the manual driving mode, and the user manipulates the one joystick lever in the function activation state to generate the signals to drive the vehicle in the manual driving mode, such that the vehicle travels in the manual driving mode (step S58).

If the touch signals are generated simultaneously from the two joystick levers 20 without a time interval, only one joystick lever is brought into the function activation state, and the remaining one joystick lever is brought into the function deactivation fixed state. In this case, the one joystick lever brought into the function activation state is any one of the right and left joystick levers that the user may easily and conveniently manipulate.

As still another example, when the determination result from step S55 indicates that no touch signal has been generated from either of the two joystick levers 20 (step S61), and the state of both the two joystick levers 20 is changed to the folded state and the vehicle is continuously maintained in the autonomous driving mode after a predetermined time (e.g., 1 minute) has elapsed (step S62), such that the vehicle travels in the autonomous driving mode to the destination (step S63).

Figure 8:
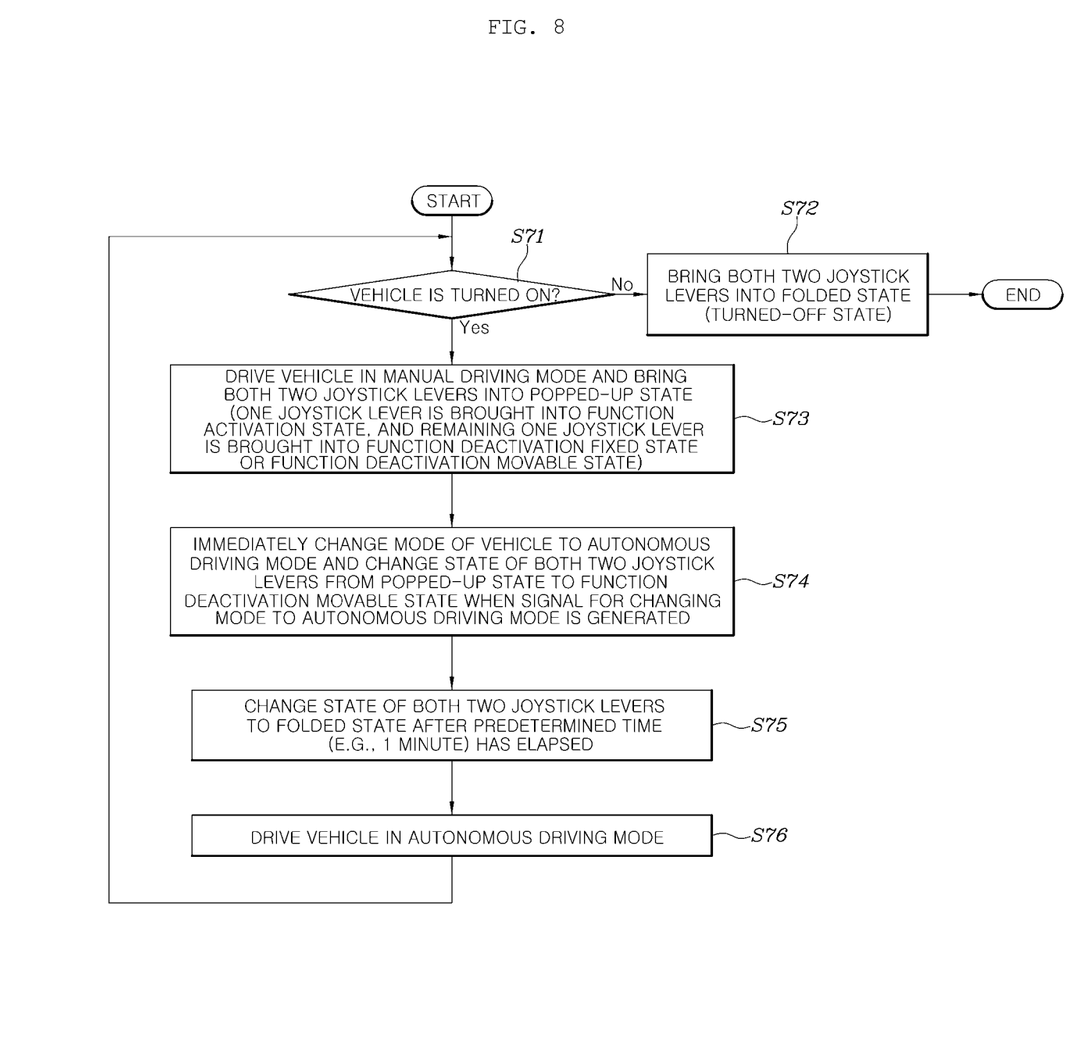
FIG. 8 is an example flowchart illustrating a control method when the mode changes from the manual driving mode to the autonomous driving mode.

FIG. 8 is a flowchart for explaining a control method when the mode changes from the manual driving mode to the autonomous driving mode.

The control method according to the present disclosure includes: a first step of maintaining both the two joystick levers in the popped-up state when the vehicle travels in the manual driving mode; a second step of immediately changing the mode of the vehicle to the autonomous driving mode and entering the state of both the two joystick levers 20 to the function deactivation movable state in the popped-up state when the signal for changing the mode to the autonomous driving mode is generated in the first step; and a third step of changing the state of both the two joystick levers 20 to the folded state and driving the vehicle in the autonomous driving mode after a predetermined time has elapsed after the second step.

That is, when the vehicle is in the turned-off (OFF) state in a step (step S71) of determining whether the vehicle is turned on (ON), both the two joystick levers 20 are brought into the folded state (step S72), and the control logic is ended.

When the vehicle is turned on and travels in the manual driving mode, both the two joystick levers 20 are maintained in the popped-up state (step S73).

In step S73, one of the two joystick levers 20 is brought into the function activation state, and the remaining one joystick lever is brought into the function deactivation fixed state or the function deactivation movable state.

In this case, the user manipulates the one joystick lever in the function activation state to generate the signals (the acceleration signal, the deceleration signal, and the steering signal) to drive the vehicle in the manual driving mode, such that the vehicle travels in the manual driving mode.

After step S73, when the signal for changing the mode to the autonomous driving mode is generated as the user manipulates the mode change button or switch, the mode of the vehicle is immediately changed to the autonomous driving mode, and the state of both the two joystick levers 20 is changed to the function deactivation movable state in the popped-up state (step S74).

When a predetermined time (e.g., 1 minute) has elapsed after step S74, the state of both the two joystick levers 20 in the popped-up state is changed to the folded state (step S75), and the vehicle travels in the autonomous driving mode to the destination (step S76).

As described above, implementations according to the present disclosure provides a method of allowing the user to control the operations of the two joystick levers 20 based on whether the joystick levers 20 are touched and on the change in driving modes of the vehicle in the configuration in which the dual integrated control apparatus 1 having the joystick levers 20 are provided in the autonomous vehicle, thereby improving the safety related to the operations of the joystick levers 20, restricting the occurrence of an accident, and improving driving safety.

While the specific implementations of the present disclosure have been illustrated and described, it will be obvious to those skilled in the art that the present disclosure may be variously modified and changed without departing from the technical spirit of the present disclosure defined in the appended claims.

What is claimed is:

1. A dual integrated control apparatus for an autonomous vehicle, the dual integrated control apparatus comprising:
   a first joystick lever and a second joystick lever; and
   a first touch sensor coupled to the first joystick lever; and
   a second touch sensor coupled to the second joystick lever,
   wherein the first joystick lever is configured to, based on the first touch sensor detecting a user's touch, operate in a function activation state, the first joystick lever being configured to, in the function activation state, be manually operable and generate at least one of an acceleration signal, a deceleration signal, or a steering signal for a vehicle based on operation of the first joystick lever,
   wherein the second joystick lever is configured to, based on the first touch sensor detecting the user's touch, operate in a function deactivation fixed state or a function deactivation movable state, the second joystick lever being configured to, (i) in the function deactivation fixed state, be manually inoperable, and (ii) in the function deactivation movable state, be manually operable and restricted from generating the acceleration signal, the deceleration signal, or the steering signal for the vehicle,
   wherein the first and second joystick levers are configured to be maintained in a popped-up state based on the vehicle being in a manual driving mode, and
   wherein the first and second joystick levers are configured to change to a folded state based on the vehicle being in an autonomous driving mode.

2. The dual integrated control apparatus of claim 1, further comprising an actuator configured to fold or pop up at least one of the first joystick lever or the second joystick lever.

3. The dual integrated control apparatus of claim 1, wherein the first joystick lever and the second joystick lever are configured to be folded based on the vehicle being turned off, and
   wherein the first joystick lever and the second joystick lever are configured to be popped up based on the vehicle being turned on and entering a manual driving mode.

4. The dual integrated control apparatus of claim 1, wherein, based on the vehicle being turned on and the first and second touch sensors detecting user's touches at a time interval, one of the first and second joystick levers that is coupled to one of the first and second touch sensors detecting the user's touch first is configured to operate in the function activation state, and the other one of the first and second joystick levers is configured to operate in the function deactivation fixed state.

5. The dual integrated control apparatus of claim 1, wherein the first and second joystick levers are configured to, based on the vehicle being turned on and the first and second touch sensors detecting no touch, change to a folded state.

6. A dual integrated control apparatus for an autonomous vehicle, the dual integrated control apparatus comprising:
a first joystick lever and a second joystick lever; and
a first touch sensor coupled to the first joystick lever; and
a second touch sensor coupled to the second joystick lever,
wherein the first joystick lever is configured to, based on the first touch sensor detecting a user's touch, operate in a function activation state, the first joystick lever being configured to, in the function activation state, be manually operable and generate at least one of an acceleration signal, a deceleration signal, or a steering signal for a vehicle based on operation of the first joystick lever,
wherein the second joystick lever is configured to, based on the first touch sensor detecting the user's touch, operate in a function deactivation fixed state or a function deactivation movable state, the second joystick lever being configured to, (i) in the function deactivation fixed state, be manually inoperable, and (ii) in the function deactivation movable state, be manually operable and restricted from generating the acceleration signal, the deceleration signal, or the steering signal for the vehicle, and
wherein based on a manual driving mode changing to an autonomous driving mode, the first and second joystick levers are configured to enter the function deactivation movable state.

7. The dual integrated control apparatus of claim 1, wherein the first and second joystick levers are configured to, based on the first and second joystick levers being in the popped-up state and the first and second touch sensors not detecting a user's touch, enter the function deactivation movable state in the popped-up state.

8. The dual integrated control apparatus of claim 1, wherein, based on only one of the first and second touch sensors detecting a user's touch, one of the first and second joystick levers that is coupled to the only one of the first and second touch sensors is configured to operate in the function activation state, and the other of the first and second joystick levers is configured to operate in the function deactivation movable state.

9. The dual integrated control apparatus of claim 1, wherein, based on the first and second touch sensors detecting user's touches simultaneously, one of the first and second joystick levers is configured to operate in the function activation state, and the other of the first and second joystick levers is configured to operate in the function deactivation fixed state.

10. A method of controlling a dual joystick lever system for an autonomous vehicle, wherein the dual joystick lever system includes a first joystick lever and a second joystick lever, the method comprising:

based on (i) a vehicle travelling in a manual driving mode, (ii) the first and second joystick levers being in a popped-up state, and (iii) touch signals being generated for both the first and second joystick levers, operating one of the first and second joystick levers in a function activation state, and operating the other of the first and second joystick levers in a function deactivation fixed state; and based on a touch release signal being generated for one of the first and second joystick levers in the popped-up state, operating one of the first and second joystick levers that causes the touch release signal to generate, in a function deactivation movable state, and maintaining the other of the first and second joystick levers that causes the touch signal to continuously generate, in the function activation state, wherein the function activation state is a state in which a joystick lever is configured to be manually operable and generate at least one of an acceleration signal, a deceleration signal, or a steering signal for the vehicle based on operation of the joystick lever, wherein the function deactivation fixed state is a state in which the joystick lever is configured to be manually inoperable, and wherein the function deactivation movable state is a state in which the joystick lever is configured to be manually operable and restricted from generating the acceleration signal, the deceleration signal, or the steering signal for the vehicle.

11. The method of claim 10, wherein, based on the touch signal being generated again for one of the first and second joystick levers that has caused no touch signal to generate, the one of the first and second joystick levers is configured to operate in the function deactivation fixed state, and the other of the first and second joystick levers that causes the touch signal to continuously generate is configured to remain in the function activation state.

12. The method of claim 10, wherein, based on touch release signals being generated for the first and second joystick levers in the popped-up state, the vehicle is configured to automatically switch to an autonomous driving mode, and the first and second joystick levers are configured to operate in the function deactivation movable state.

13. The method of claim 12, wherein the first and second joystick levers is configured to, based on (i) the first and second joystick levers being in the function deactivation movable state and (ii) no touch signal being generated continuously for a predetermined time, change to a folded state.

14. A method of controlling a dual joystick lever system for an autonomous vehicle, wherein the dual joystick lever system includes a first joystick lever and a second joystick lever, the method comprising:
maintaining the first and second joystick levers in a folded state based on a vehicle traveling in an autonomous driving mode;
based on (i) the vehicle being in an autonomous driving mode state and (ii) a signal for changing a mode to a manual driving mode being generated, changing the first and second joystick levers to a popped-up state; and
based on a signal related to a user's touch being generated for the popped-up joystick levers, operating one of the first and second joystick levers in a function activation state, and operating the other of the first and second joystick levers in a function deactivation fixed state or a function deactivation movable state, wherein the function activation state is a state in which a joystick lever is configured to be manually operable and generate at least one of an acceleration signal, a deceleration signal, or a steering signal for the vehicle based on operation of the joystick lever, wherein the function deactivation fixed state is a state in which the joystick lever is configured to be manually inoperable, and wherein the function deactivation movable state is a state in which the joystick lever is configured to be manually operable and restricted from generating the acceleration signal, the deceleration signal, or the steering signal for the vehicle.

15. The method of claim 14, further comprising:
operating an actuator to fold or pop up at least one of the first and second joystick levers.

16. The method of claim 14, further comprising:
entering the first and second joystick levers to the function deactivation movable state in the popped-up state, in a non-touched state in which the first and second joystick levers are not touched by the user.

17. The method of claim 14, wherein, based on the touch signal being generated from one of the first and second joystick levers, (i) the one of the first and second joystick levers that has caused the touch signal to generate is configured to operate in the function activation state, (ii) the other of the first and second joystick levers that has caused no touch signal to generate is configured to remain in the function deactivation movable state, (iii) the vehicle is configured to change from the autonomous driving mode to the manual driving mode, and (iv) the user is allowed to manipulate the one of the first and second joystick levers in the function activation state to generate a signal usable to drive the vehicle in the manual driving mode.

18. The method of claim 14, wherein, based on the touch signals being generated for both of the first and second joystick levers at a time interval, (i) one of the first and second joystick levers that has caused the touch signal to generate first is configured to operate in the function activation state, (ii) the other of the first and second joystick levers that has caused the touch signal to generate later is configured to operate in the function deactivation fixed state, (iii) the vehicle is configured to change from the autonomous driving mode to the manual driving mode, and (iv) the user is allowed to manipulate the one of the first and second joystick levers in the function activation state to generate a signal usable to drive the vehicle in the manual driving mode.

19. The method of claim 14, wherein, based on no touch signal being generated from either of the first and second joystick levers, (i) the first and second joystick levers are configured to change to the folded state, and (ii) the vehicle is configured to continuously remain in the autonomous driving mode.

* * * * *